Feb. 8, 1949.   R. K. JEFFREY   2,461,116
HYDRAULIC SYSTEM FOR CONTROLLING THE OPERATION
OF ROTARY HYDRAULIC MOTORS
Filed July 7, 1944   2 Sheets-Sheet 1
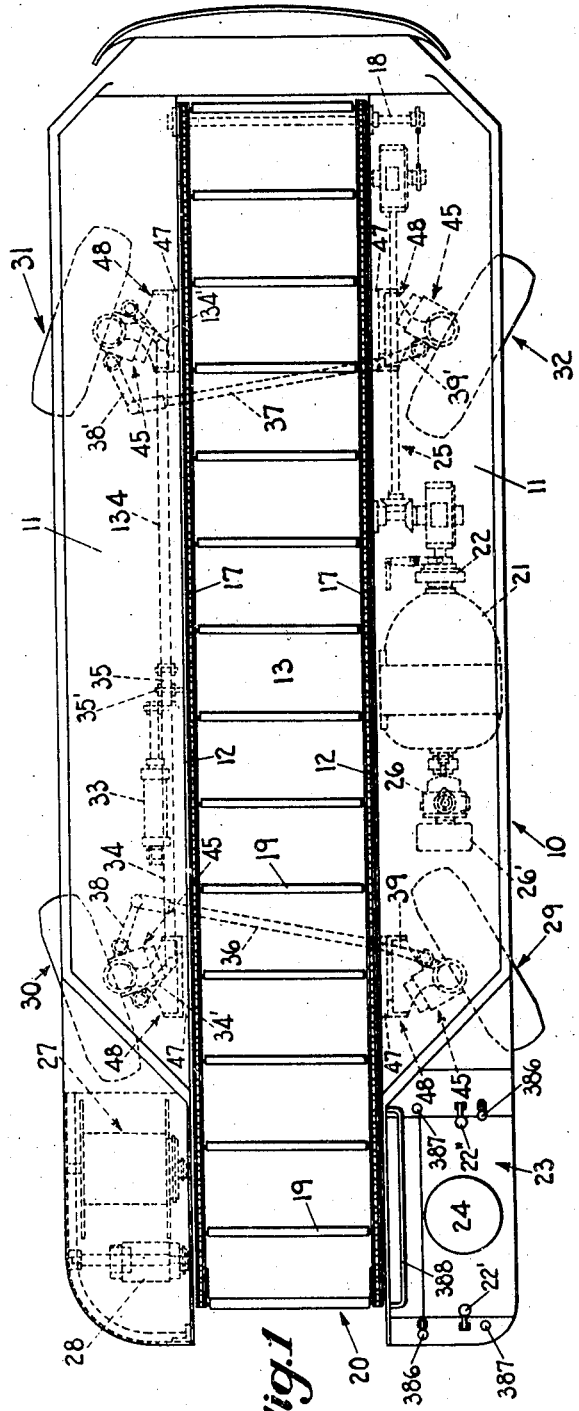
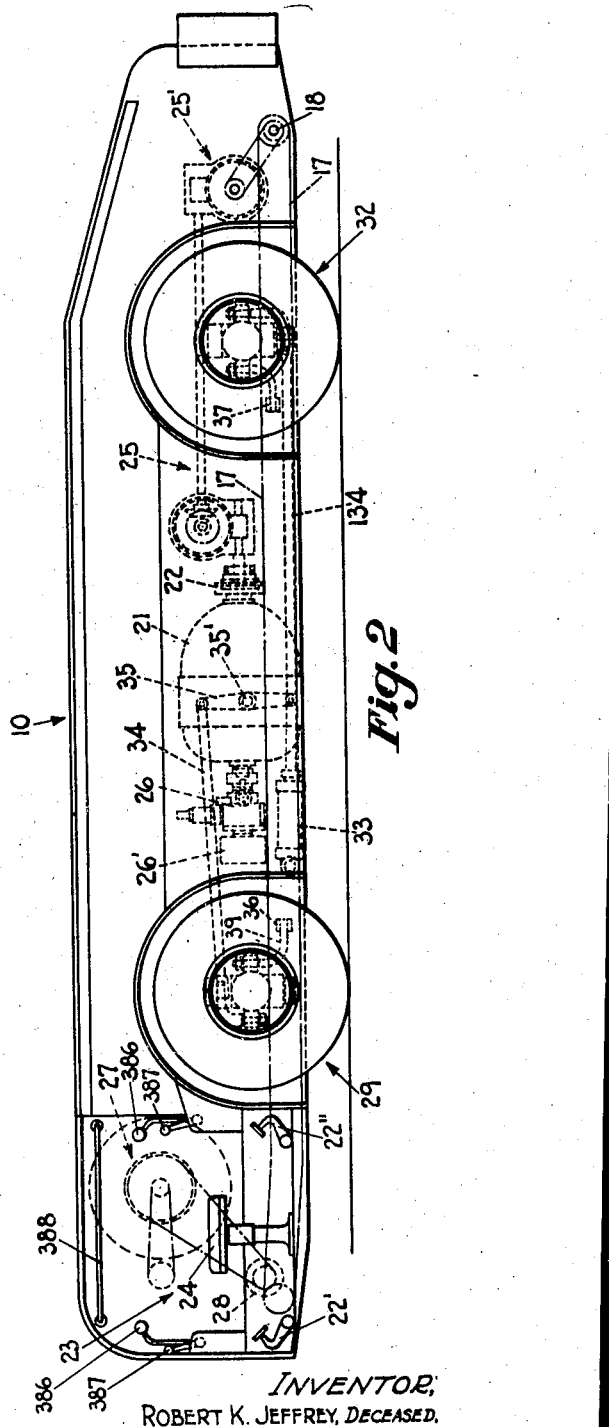
INVENTOR;
ROBERT K. JEFFREY, DECEASED,
BY FLORENCE H.C. JEFFREY, EXECUTRIX,
BY Chas. M. Niesen,
ATTY.

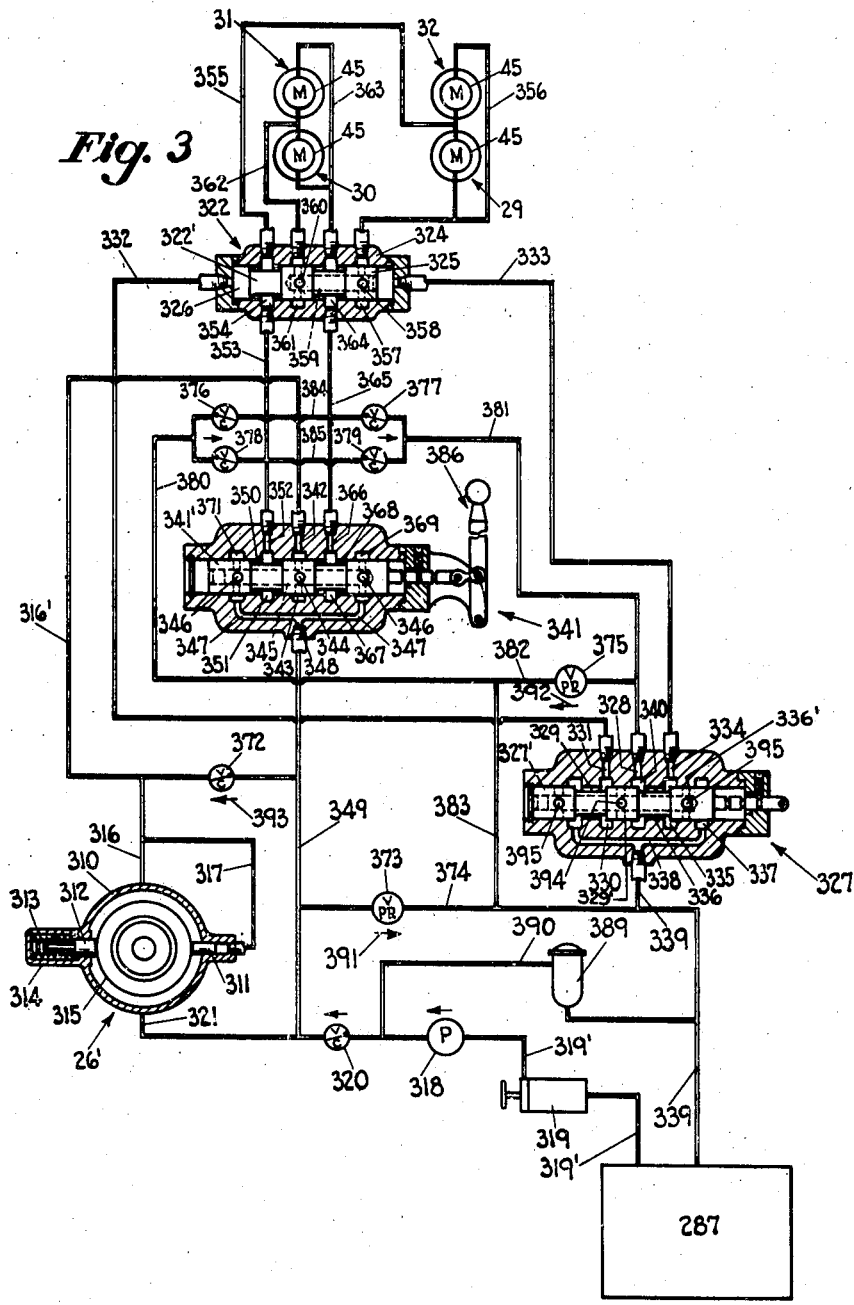

Patented Feb. 8, 1949

2,461,116

UNITED STATES PATENT OFFICE 2,461,116

HYDRAULIC SYSTEM FOR CONTROLLING THE OPERATION OF ROTARY HYDRAULIC MOTORS

Robert K. Jeffrey, deceased, late of Bexley, Ohio, by Florence H. C. Jeffrey, executrix, Bexley, Ohio, assignor, by mesne assignments, to The Jeffrey Manufacturing Company, a corporation of Ohio Application July 7, 1944, Serial No. 543,788

5 Claims. (Cl. 60—53)

This invention relates to hydraulic apparatus which may be applied with particular advantage to a vehicle adapted to carry coal from a coal loading machine to a conveyor for feeding coal into mine cars.

One of the objects of the invention is the provision of improved and efficient means for connecting a plurality of fluid pressure traction motors of a vehicle either in series or in parallel or in series parallel.

Another object of the invention is an improved and efficient system of control of a fluid pressure motor connected to a traction wheel of a vehicle to drive the same or to act as a brake when the traction wheel drives the motor as a pump.

A further object of the invention is to provide controlling means for fluid pressure motor operated traction mechanism of a vehicle such that when the vehicle is stopped parking braking becomes automatically available without the use of additional mechanical braking mechanism.

Another object of the invention is the provision of a hydraulic system of piping and connections for the hydraulic traction motor of a vehicle, including a reversing switch for the motor to effect braking of the vehicle either by neutral setting of the reversing switch or by moving the latter to reversing position while the vehicle is in motion.

A further object of the invention is the provision of a reversing switch for the rotary hydraulic motor connected to a traction wheel of a vehicle to drive the latter forwardly or rearwardly.

Another object of the invention is the provision of a supercharging pump in a fluid pressure vehicle controlling system for replenishing fluid pressure medium, such as oil, lost therefrom through leakage, and to replace heated fluid pressure medium in the system.

A further object of the invention is the provision of an improved and efficient system of control for rotary motors connected to a vehicle to drive the same, so that the pump supplying oil to the motors may be operated continuously or without interruption during starting, slowing down, stopping and reversing the travel of the vehicle.

Another object of the invention is the provision in a system of control of rotary motors connected to a vehicle to drive the same, of means for effecting braking of the vehicle by the motors acting as pumps even though the supply pump is no longer operating due to the discontinuance of operation of the engine driving said supply pump.

Other objects of the invention will appear hereinafter, the novel features and combinations being set forth in the appended claims.

In the accompanying drawings,

Fig. 1 is a plan view of a vehicle including the invention;

Fig. 2 is a side elevational view of the vehicle of Fig. 1; and

Fig. 3 is a piping diagram of the hydraulic system for controlling traction motors mounted on the vehicle wheels.

This application is a continuation in part of co-pending application, Serial No. 407,166, filed August 16, 1941, now Patent 2,357,742, dated September 5, 1944, for an improvement in a vehicle.

Referring particularly to Figs. 1 and 2 of the drawings, there is illustrated a vehicle in the form of a coal carrying shuttle car which includes the preferred embodiment of the invention. This vehicle or shuttle car comprises a body 10 which is formed by opposite sloping side walls 11, 11 forming a receptacle for the material to be carried, such as coal, which sloping side walls lead to spaced vertical walls 12, 12 between which there extends a bottom plate 13. The bottom plate 13 forms the bottom of the material receiving receptacle and of a conveyor which includes endless chains 17, 17 which extend between rear end drive sprockets carried by drive shafts 18 and idler head sprockets at the front of the vehicle. Transverse flights 19 are interconnected between the endless chains 17 to form the complete conveyor generally designated by the reference character 20. It is evident that material may be discharged from the car by driving the upper run of the conveyor 20 forwardly, or toward the left as viewed in Fig. 1.

Along one side of the vehicle between the front and rear wheels and below one of the sloping side walls 11 is provided a large electric motor 21 which is preferably the only electric motor on the vehicle and anything which is driven is ultimately power operated from said motor 21. One end of the armature shaft of the motor 21 is connected through a clutch 22 which is operable from an operator's station 23 by an appropriate pair of foot levers 22', 22'' preferably interconnected so that the operator may face either forwardly or rearwardly while riding on the seat 24. From the clutch 22 a gear train 25 extends through reduction mechanism 25' to the drive shaft 18 of the conveyor 20.

The motor 21 also drives hydraulic pumps 26,

26', for supplying hydraulic fluid under pressure which is employed to drive the traction wheels of the vehicle, to steer the vehicle and also to control the hydraulic motor 28 of electric cable reel 27.

The shuttle car or vehicle 10 is also provided with four wheels 29, 30, 31 and 32 which are preferably all traction wheels and preferably all steering wheels. Each of these wheels is of similar construction except for certain reversal of parts which is obvious from Fig. 1 of the drawings.

Referring particularly to Figs. 1 and 2 of the drawings, it will be seen that steering of all of the four wheels 29, 30, 31 and 32 is effected by a single hydraulic piston motor 33 which is connected by a longitudinally and forwardly extending rod 34 and by a longitudinally and rearwardly extending rod 134 interconnected by a pivot arm 35 to the forward and rearward pair of wheels which are pivoted about upwardly extending axes, the forward wheels and rearward wheels each being interconnected by steering mechanism including transverse tie rods 36 and 37, respectively, the opposite ends of each of which are connected to arms rigidly attached to the stub axle of the associated wheel; the arms associated with the tie rod 36 being seen at 38 and 39, respectively, and being associated with wheels 30 and 29, respectively.

The arms rigidly attached to the stub axles of the wheels 29 and 32 are designated 39 and 39' as shown in Fig. 1. The arms rigidly attached to the stub axles of the wheels 30 and 31 are designated 38 and 38'. Connected rigidly to the stub axle of the wheel 30 is the additional arm 34' which is pivotally connected to the front end of the rod 34. Connected rigidly to the stub axle of the wheel 31 is the additional arm 134' which is pivotally connected to the rear end of the rod 134. Since the two armed lever 35 is pivoted midway between its ends to the pin 35' which is fixed to the vertical plate 12, any longitudinal movement of the piston rod of the hydraulic piston motor 33 will tilt the lever 35 on its fixed pivot 35' and move the rods 34 and 134 in opposite directions to effect swinging of the front pair of wheels and the rear pair of wheels in opposite directions, as illustrated in Fig. 1 of the drawings.

The wheels 29, 30, 31 and 32 may be of any conventional construction and may even embrace a type of wheel adapted to run on a track or a wheel adapted to drive an endless crawler such as of the Caterpillar type. As previously indicated, each wheel 29, 30, 31 and 32 is mounted upon a stub axle which includes within its construction a hydraulic engine 45 which is preferably operable either as a motor to drive the wheel or as a pump to be driven by the wheel. Each stub axle also includes within its construction at least part of a speed changing mechanism interposed between the engine 45 and the wheel. The entire mechanism comprising the wheel, hydraulic engine 45, and speed changing mechanism is mounted as a unit for swinging movement about an inclined upwardly extending axis to provide for steering of the vehicle as previously mentioned, and the entire mechanism is shown, described and claimed in the parent application, now Patent 2,357,742, above identified.

Four brackets 48 are each rigidly attached to the frame of the vehicle and specifically to spacers 47 which in turn are each rigidly attached to a wall 12. Brackets 48 each carry a pivot pin, not here shown, which extends upwardly and is preferably slightly inclined inwardly to the vertical. These pins each pivotally carry one of the stub axles of a wheel 29, 30, 31 or 32 for steering movement.

Each hydraulic engine 45 includes a rotor, swash plate, pistons and associated mechanism, and for the precise structure of these elements reference is made to the patent to Robert K. Jeffrey, 2,331,694, granted Oct. 12, 1943, for an improvement in a Hydraulic pump or motor.

It is here pointed out that each engine 45 is reversible and each engine 45 includes two ports for hydraulic fluid either of which may be the supply port and the other the exhaust port, depending upon the direction in which the rotor of the engine 45 is to be driven to drive the wheel. When the rotor of engine 45 is being driven to drive the wheel the engine is, obviously, acting as a motor and when the wheel is driving the rotor, such for example as when the vehicle is coasting, the engine 45 is acting as a pump and by throttling the output thereof the engine or pump may be employed as a brake for the wheel.

In the operation of the vehicle it is evident that in the preferred embodiment of the invention all four wheels are traction wheels as well as steering wheels, though it is, of course, evident that as to certain aspects of the invention traction may be limited to either the front wheels or the rear wheels, and steering may likewise be limited to either the front wheels or the rear wheels, and the traction may be on the same pair of wheels or traction may be applied to one pair of wheels and steering to the other pair. It is preferred, however, to have all wheels both traction and steering wheels as this reduces the necessary size of any hydraulic engine associated with a traction wheel and also makes possible the turning of the machine in a minimum of space.

Referring now to Fig. 3 showing the hydraulic system for controlling the traction motors 45, the various operations will be described. A variable volume pump 26' is employed in the system and may be connected to be driven from the armature shaft of the electric motor 21 either through the constant volume gear pump 26 or by means of gearing extending laterally from the armature shaft independently of the pump 26. For convenience in illustrating, the pump 26' is shown in Figs. 1 and 2 as coupled directly to the armature shaft by means of a shaft protruding from the gear pump 26.

While the variable volume pump 26' may be of the adjustable swash plate type arranged as shown in the co-pending application of Robert K. Jeffrey, deceased, S. N. 498,087, filed Aug. 10, 1943, now Patent No. 2,452,760, for an improvement in Mining machines, the self-centering pump disclosed in the De Millar Patent No. 2,057,089, granted Oct. 13, 1936, for an improvement in Hydraulic road grader, is shown in Fig. 3 of the accompanying drawings to simplify the disclosure herein.

This self-centering variable volume pump 26' comprises a casing 310 having at diametrically opposite sides thereof a plunger 311 adapted to be acted on by hydraulic pressure, and a plunger 312 acted on by the spring 313 in the cup 314. Between the plungers is the ring 315 which when in its position of greatest eccentricity effects maximum pumping. When the pressure in the supply pipe 316 becomes excessive the hydraulic pressure through the branch pipe 317 on the plunger 311 effects centering of the ring 315 against the action of the spring 313.

A supercharging pump 318 of relatively low capacity and low pressure is arranged as shown in Fig. 3 to draw oil from the supply tank 287 through the filter 319 in suction pipe 319' and deliver such oil through the check valve 320 into the suction pipe 321 which is connected to the bottom of the pump 26'. The variation in the volume of delivery from the pump 26' is entirely automatic and is dependent upon variations in hydraulic pressures in the supply pipe 316 due to various conditions surrounding the operation of the vehicle by means of the traction motors 45 connected to the vehicle wheels.

The motors 45, one mounted on each of the four wheels, may all be connected in parallel for low speed of travel of the vehicle and in series parallel for high speed of travel. In Fig. 3 the motors 45 on each side are arranged in series parallel.

The series parallel valve mechanism 322 comprises a slide valve 322' which has two positions, one at the right for parallel connection of the motors 45 and the other at the left, as shown for series parallel connection of all of the motors 45.

The ends of the valve chests 324 may be provided with hydraulic cylinders, and the ends of the slide valve 322' may constitute pistons 325 and 326 adapted to reciprocate in such cylinders. It will thus be seen that the slide valve 322' may be shifted to series parallel position when the piston 325 is moved to the left to series parallel setting and by acting on the piston 326 the valve 322' may be shifted to the right to parallel setting.

A three position pilot valve mechanism 327 is arranged to control the operation of the series parallel valve mechanism 322. When the slide valve 327' is in its right-hand position the supply port 328 is connected through the annular channels 340, 329' and 330 to the port 331 and the pipe 332 which is connected to the hydraulic cylinder at the left-hand end of the chest 324 of the series parallel valve mechanism 322. Therefore, when the slide valve 327' of the pilot valve mechanism 327 is moved to the right, the series parallel slide valve 322' will be moved to the right to parallel position.

When thus moved to the parallel position the piston 325 will be moved to the right to force the oil out of the cylinder in which the piston 325 moves. The oil which the piston 325 thus forces out passes into the pipe 333 and thence into port 334 through annular ports 335, 336', 337 into port 338 and exhaust pipe 339 to the supply tank 287.

When the slide valve 327' is moved to its left-hand position the supply port 328 will be connected through the annular channels 340, 336 and 335 to the port 334 and thence through the pipe 333 to the cylinder to the right of the piston 325. Therefore, when hydraulic pressure is exerted on the piston 325 at the right-hand of the slide valve 322' the latter will be moved to the left to its series parallel position.

The slide valve 327' when moved from either the right or left-hand position to the central or free-wheeling position does not cause the series parallel slide valve to shift its position, but it blocks the ports 330 and 335 to lock oil in the hydraulic cylinders of the series parallel valve chest 324, thereby locking the slide valve 322' in that position in which it was last set.

When the slide valve 327' is in central position, free wheeling of the vehicle may be had. This is a desirable feature to facilitate towing of the vehicle. In that event the motors 45 on the vehicle wheels will be driven as pumps and a circuit established by the central position of the valve 327' for free flow of the oil.

Assuming that the vehicle is being towed and that the pipe 353 is the pressure or exhaust side of the wheel motors, the pipe 365 will be the suction side. The circuit for the motors 45 under these conditions will be from pipe 353 to pipe 385 and thence through check valve 379 to pipe 381, and the core 327' being in the central or free-wheeling position, the oil flows through radial port 384 into the interior bore of valve 327', through port 337 to pipe 339 and the tank 287. The pipe 365 being the suction side under these circumstances, will receive oil from the tank 287 by way of pipe 319' including filter 319 and pipes 349, 374, 383, 380, check valve 376 and pipe 384 to pipe 365. Pipe 383 may also receive oil from pipe 339 through pipe 374.

If the pipe 365 is the exhaust or pressure side of the motors 45 and the pipe 353 the suction side while the vehicle is being towed and the motors 45 acting as pumps, the circuit established will be as follows: check valve 377, pipe 381, valve 327 in central position, pipe 339 to tank 287, pipe 319' including filter 319, pipes 349, 374, 383, 380, check valve 378, and pipe 385 to pipe 353.

Normally, the vehicle may be started from rest by connecting the motors 45 in parallel although under some circumstances the vehicle may be started from rest with all the motors 45 connected in series parallel. When the motors 45 are connected in parallel the tractive capacity will be greater, but the speed will be one half of that obtained when all the motors 45 are connected in series parallel. This can readily be understood by assuming any given volume of delivery of the main pump 26' and taking into consideration the volume of flow through the motors 45. The speed of the motors is dependent upon volume of flow therethrough and consequently when the motors are in parallel, one quarter of the pump delivery will flow through each motor, resulting in less speed than when only half the volume of pump delivery flows through each motor when connected in series parallel. The connections for the motors 45, as shown in Fig. 3, provide differential action between the driving wheels and give a positive four wheel drive when all the motors are in parallel.

Before the vehicle is stopped the connection of motors is brought back to parallel, from being in series parallel. Consequently, when the vehicle is at rest under these circumstances, the slide valves 322' and 327' will be in their right-hand positions with slide valve 322' held there by a holding circuit including the pipe 332. Even when the motors 45 are driven as pumps to secure braking of the vehicle, the pumping action will produce a pressure on the piston 325 when the slide 327' is in the left hand position as shown, or upon the piston 326 when the slide 327' is in the right hand position to hold the slide valve 322' in its proper position.

The throttle and reversing valve mechanism 341 has three positions including the neutral or central position shown in Fig. 3. In this central or neutral position a no-load by-pass circuit is established for the main pump 26'. The supply pipe 316' receives oil under pressure from the pump 26' through pipe 316 and extends to the port 342 which is connected to the annular channel 343 and the latter is connected by the radial passages 344 to the inner cylindrical recess 345. From the recess 345 the liquid is free to pass through the radial passageways 346 into the passageway 347 and thence through the port 348 into the return line 349 to the suction pipe 321. The pump 26' may therefore be operated continuously even when the vehicle is at rest and this may be done with the consumption of very little power as the electric motor 21 connected to the pump 26' to drive the same, may simply idle when the vehicle is at rest with the reversing valve mechanism 341 in neutral position.

When the throttle and reversing slide valve 341' is moved to the right the supply port 342 will be connected through the annular channels 343, 350 and 351 to the port 352. Then the oil flows through the pipe 353 into the annular port 354. If the series parallel slide valve 322' at this time is in its left-hand or series parallel position, the oil will continue to flow through the pipe 355 into the motors 45 on the wheels 29 and 32 and thence through the pipe 356 into the annular port 357. Since the slide valve 322' is in series parallel position the oil will continue through the hole 358, the cylindrical recess 359 and hole 360 into the annular port 361 and thence through the pipe 362 and the motors 45 on the wheels 30 and 31 into the pipe 363 which is connected to the annular port 364. A pipe 365 connects the port 364 to the port 366 which leads to the annular port 367. Since the reversing slide valve 341' is now in its right-hand position, the oil continues through the annular channels 368 and 369 into the passageway 347 which is connected by means of the port 348 to the return pipe 349 and the suction pipe 321 of the main pump 26'.

It will thus be seen that when the slide valve 322' of the series parallel valve mechanism 322 is in its left-hand or series parallel position and the reversing slide valve 341' is in its right-hand position, the main pump 26' will be connected up to the rotary hydraulic motors on the vehicle wheels with all of these motors in series parallel, the circuit being such that the total volume of oil flowing to the wheel motors 45 is first divided between the motors of wheels 29 and 32 and upon passing therethrough is merged in the series parallel valve and then redivided between the motors of wheels 30 and 31.

Now by moving the slide valve 341' to its left-hand position, the flow from the pump 26' through the motors 45 will be reversed. This can readily be seen by leaving the slide valve 322' in series parallel position and moving the slide valve 341' to its left-hand position where the annular channel 368 will connect the annular ports 343 and 367 and where the annular channel 350 will connect the annular ports 351 and 371. Then and in that event the flow of oil will be first through the motors 45 of the wheels 30 and 31, and then through the motors of wheels 29 and 32.

When the wheel motors are to be operated or connected in parallel the slide valve 322' is shifted to the right by moving the slide valve 327' of pivot valve 327 to the right and assuming that the slide 341' of the throttle and reversing valve 341 is positioned so that pipe 353 is under pressure from main pump 26' a circuit for the motors is established from pipe 353 through port 354 to port 361 whereby the total volume of oil flowing from pipe 353 is divided between pipe 355 leading to motors 45 of wheels 29, 32 and pipe 362 leading to motors 45 of wheels 30, 31. As previously described, the total volume of oil flowing in each pipe 355 and 362 is divided between the motors 45 to which they are connected, thus, when the vehicle is traveling in a straight line, each wheel motor 45 will receive one-fourth of the total volume of oil flowing in pipe 353. The slide valve 322' when in its right hand position also connects ports 357 and 364 whereby oil flowing therein from the wheel motors 45 is admitted to pipe 365 and is normally returned to the main pump 26'. It will be seen that upon a reversal of the position of slide 341' of reversing and throttle valve 341 the flow of oil to and through the wheel motors will be reversed.

When it is desired to stop the vehicle, it may first be slowed down by changing the connection of the motors 45 from series parallel to parallel. Braking may be accomplished by either centering the reversing valve mechanism 341 or moving the lever 386 to reverse directional position, with the result that the oil pressure developed by the fluid motors 45 will be relieved through valve 375. The vehicle will then be decelerated at a constant rate until it comes to rest.

As illustrated in Fig. 3, the motors are in series parallel relation for vehicle fast speed transportation. Such braking by reversing the valve 341' may be effected whether the vehicle is traveling forwardly or rearwardly. During such braking operations by reversal, the pump 26' is endeavoring to drive the motors 45 as such in a direction opposite to the direction in which the vehicle is traveling while at the same time the momentum of the vehicle is attempting to drive the motors 45 as pumps. The motors 45 thus effect a throttling action to the flow from the pump 26' and the increase in hydraulic pressure in the supply line 316' will automatically effect centering of the pump 26' to decrease the flow. This is the action either with the type of self-centering pump 26' as shown in Fig. 3 or with the tilting swash plate type of variable volume pump.

On the level or up grade the operator of the vehicle can readily stop the vehicle by reversal of the slide valve 341' and then move the latter to neutral position for park braking; then the motors 45 will be locked since the oil therein will be blocked off and circulation can take place only by overcoming valve 375.

If the reversal braking operation takes place on a down grade and the motors are actually driven as pumps in opposition to the main pump 26', the return line 349 may receive more oil flow than the suction pipe 321 can accommodate, in which event the flow will be taken care of by the check valve 372 which is adapted to open from the return pipe 349 into the supply pipe 316'.

If, due to a down grade travel of the vehicle, the motors 45 over-run the pump 26', the excess volume will pass through the check valve 372. Make up oil from supercharging pump 318 flows into pipe 349 to replenish the oil lost from the circuit by leakage.

The relief valve 373 is provided as a safety to the auxiliary pump 318. This relief valve also provides means for taking a small quantity of hot oil from the semi-closed hydraulic system so that pump 318 can replenish the system with fresh cool oil.

Actual stopping of the vehicle may be effected either by using reverse directional positioning of the valve 341' or by the centering thereof as above explained. When centering the valve mechanism 341, throttling may be effected by movement of the slide valve 341' gradually to neutral or central position while the vehicle is still moving along the mine bottom. If this throttling action to secure stopping, particularly when going down grade, is too sudden, the high pressure relief valve 375 will be automatically opened to protect the pneumatic rubber tires of the vehicle by permitting the wheels to roll along while the motors 45 act as pumps with the braking action of the high pressure relief valve thereon.

When the reversing valve 341' is in neutral position and the vehicle by its momentum is driving the motors 45 as pumps, passage for the oil through the high pressure relief valve 375 is afforded by either of the two pairs of check valves 376, 379 or 378, 377 and the pipe 381, relief valve 375, pipes 382, 383 and 380. The pipe 365 is connected to the check valves 376, 377 between the same by being connected to the pipe 384. The pipe 353 is connected to the check valves 378, 379 between the same by being connected to the pipe 385.

All of the check valves 376, 377, 378 and 379 open toward the right as viewed in Fig. 3. If the reversing valve mechanism 341 is closed too suddenly while the vehicle is traveling and the motors 45 are driven as pumps by momentum of the vehicle, the flow of oil may be either from the pipe 353 into the pipe 385 or from the pipe 365 into the pipe 384. If pipe 353 is the supply pipe, the check valve 379 will open and permit flow into pipe 381 and thence through the high pressure relief valve 375 into the pipe 382 which is connected to pipe 380 and the pipe 383 which is connected to the supply tank 287. The suction line for the motors 45 acting as pumps will then be pipe 380 which is connected to receive oil from pipe 382 and supply tank 287 through pipe 383, check valve 376, pipes 384, 365, annular port 364 to pipe 363.

If pipe 365 is the supply pipe from the motors 45 acting as pumps, the passage through the relief valve 375 will be by way of check valve 377 and pipe 381. The suction line will be established by pipe 380, check valve 378 and pipes 385, 353 through annular port 354 to pipe 355.

In order to avoid sudden reversals of the slide valve 341 a lever 386 of extra length may be pivotally mounted and connected thereto as shown in Fig. 3. Two such levers may be interconnected so that the driver on the seat 24 may face either forwardly or rearwardly in position to easily actuate either lever 386, as shown in Figs. 1 and 2. In a similar manner, the levers 387 are interconnected and flexibly attached to the slide valve 327' for operation thereof.

The hand rail 388 is for the convenience of the operator. By grasping the hand rail 388 with one hand the operator may more readily retain his seat 24 while operating the levers shown in Figs. 1 and 2; either lever 22', 22" being for operation of the steering mechanism, either lever 387 being for operation of the pilot valve 327 to control the series parallel valve mechanism 322, and either lever 386 being for operation of the reversing valve mechanism 341.

In order that the oil in the reservoir 287 may be cleaned continuously so long as the motor 21 is running, an additional filter 389 is provided in the by-pass pipe 390 as shown in Fig. 3. It will thus be seen that the supercharging pump 318 may draw oil through the supply tank 287 through the filter 319 and by-pass some of it through the filter 389 in the pipe 390 at all times, particularly when the vehicle is at rest, so long as the motor 21 is kept running.

While the supercharging pump 318 is useful to secure filtering of the oil returned to the supply tank 287 and to replenish oil that may be lost by leakage from the hydraulic system, such supercharging pump may be omitted if the wheel motors 45 are of the type shown in the Jeffrey Patent No. 2,331,694 above referred to wherein there are springs within the pistons of the motor which provide for the positive suction or intake of oil through the intake or suction port of the motor. Such springs or their equivalents are necessary if the supercharging pump 318 is omitted because when the motors 45 are driven as pumps by momentum of the vehicle, no hydraulic pressure would be available to keep the pistons of the motor in contact with the swash plate. When the motors 45 do not include any mechanism for holding the pistons 68 in contact with the swash plate while the motors are serving as pumps to secure breaking action, the supercharging pump 318 should be included in the system. Such supercharging pump 318 may be connected by gearing to the shaft of the motor 21.

It is therefore preferred to include the supercharging pump 318 in the system so that any type of rotary hydraulic motor may be used; that is to say, the system illustrated in Fig. 3, including the supercharging pump 318, is preferred because of its almost universal adaptation to a vehicle having rotary hydraulic motors connected to its wheels, so that the motors may be, in any event, driven as pumps to permit the elimination of mechanical brakes of the brake band type.

While the apparatus shown in Figs. 1 and 2, inclusive, is described and claimed in the parent application, Serial No. 407,166, filed August 16, 1941, now Patent 2,357,742, dated September 5, 1944 for an improvement in Vehicles, these views are included in the present application to illustrate more clearly one use of the present hydraulic system.

It should also be noted that the greater the gear reduction between the rotary hydraulic motor and the wheel, the more effective is the park braking action and the easier it is for the vehicle to move away from its stationary position, for instance, up grade. In other words, the greater the gear reduction the lower the gear ratio when the vehicle is at rest and consequently restarting from rest will cause less strain on the apparatus.

It is therefore preferable to provide a greater gear reduction between the engines 45 and the wheels in heavy vehicles because when the vehicle is parked on an up grade it can be restarted on low gear with less strain on the apparatus. For lighter vehicles a gear ratio is preferred because of the availability of greater speed both in getting started up grade and in running from place to place in the mine.

For the steepest down grades there is less free wheeling and more braking action to prevent undue speed when the greater gear reduction is embodied in the system. When the down grades are not so steep the free wheeling may be increased because less braking action is sufficient.

The pipes 353 and 365 are the terminals of the motors acting as pumps. If the valve mechanism 341 is in neutral position when the motors act as pumps, the local circuit for the pumps will be through the relief valve 375. If the valve 341 is left in its running position when the motors 45 begin to act as pumps, they will act in opposition to the main pump 26', with the result that the oil will spill over into the pipe 383 and flow through pipe 339 into the supply tank 287. In this operation hot oil from the motors 45 is cooled in the tank and may be resupplied to the main pump 26' by the supercharging pump 318.

If the vehicle is slowed down by movement of the slide valve 341' to reversal from its running position, the pumping of the motors will be added to that of the main pump 26', with the result that the low pressure relief valve 373 will be opened in the direction of the arrow 391 because more oil enters the return pipe 349 than can be taken care of by the suction pipe 321 and valve 372 is retained closed by pressure in pipe 316'.

In the event that the pumps 26' and 318 should become stalled by the stopping of the electric motor 21, and the motors 45 should be driven as pumps by the momentum of the moving vehicle, the check valve 372 may come into play as follows. Assuming the valve 322' in series parallel position, as shown in Fig. 3, and the valve 341' in its right-hand position, oil will flow from the pump 26' into pipe 355 and through all the motors 45 in series parallel, the return flow being to annular channel 368 and return pipe 349. When pump 26' becomes stalled and the motors 45 act as pumps, the oil supply from pump 26' in pipe 316' is cut off and relief is afforded by the oil flowing from pipe 349 into pipe 316' through check valve 372 and thus substantially a no-load circuit for the motors 45 that by-passes the pump 26' is established.

Now if the operator should attempt to slow down the vehicle gradually by movement of the valve 341' toward the left to its central or neutral position the oil flowing in the by-pass circuit including check valve 372 will be restricted by the gradual closing of the port 368 and a braking effect on the motors 45 acting as pumps will be had. Should the position of valve 341' be changed too rapidly and the pressure in pipe 365 increase above the pressure required to operate valve 375, the circuit including check valves 376, 377, pipes 381, 382, check valve 375, pipe 380 and check valves 376, 378 will become effective with the valve 375 acting to limit the maximum braking effect that will be applied to the wheel motors 45. The throttling action of the valve 341' will finally effect park braking because then the motors are locked by the terminal pipes 353 and 365 at the ports 350, 368. It will be seen that regardless of whether pipe 353 or 365 is the pressure or exhaust pipe from the wheel motors 45 acting as pumps, the braking circuits will be established similar to that described with the valves 341' and 375 in control.

Obviously those skilled in the art may make various changes in the details and arrangement of parts without departing from the spirit and scope of the invention as defined by the claims hereto appended, and it is therefore wished not to be restricted to the precise construction herein disclosed.

Having thus described and shown an embodiment of the invention, what is desired to be secured by Letters Patent of the United States is:

1. Apparatus of the class described comprising in combination means including a rotary fluid pressure motor, a variable volume pump comprising means for automatically controlling the volume of delivery therefrom in accordance with variation in the supply pressure, valve mechanism for controlling the supply of fluid pressure medium from said pump to said motor, means associated with said valve mechanism for establishing a closed local circuit for said motor to lock the latter in position for park braking of the motor, and a relatively high pressure relief valve in such local circuit to effect gradual stopping of said motor when said valve mechanism is moved to neutral position.

2. Apparatus of the class described comprising in combination means including a reversible rotary hydraulic motor, valve mechanism connected to said motor to control the direction of rotation thereof, means associated with said reversing valve mechanism for establishing a closed local circuit for said motor when said valve mechanism is moved to neutral position, a relatively high pressure relief valve in said local circuit, and two pairs of check valves in said local circuit, one pair in parallelism with the other pair and all check valves adapted to open in the same direction, the construction and arrangement being such that one terminal of said motor is connected to one pair of check valves between the same and the other terminal of said motor is connected to the other pair of check valves between the same so that irrespective of the direction of rotation of said motor when driven as a pump by momentum a circuit will be completed through one of each pair of check valves and said relief valve when the hydraulic pressure of the motor acting as a pump exceeds a predetermined value.

3. Apparatus of the class described comprising in combination means including a plurality of rotary hydraulic motors, valve mechanism for connecting said motors in series or in parallel, hydraulic motor mechanism for operating said valve mechanism, pilot valve mechanism for controlling said hydraulic motor mechanism to effect connection of said motors in series or in parallel, and reversing valve mechanism for controlling the direction of rotation of said rotary hydraulic motors.

4. Apparatus of the class described comprising in combination means including a plurality of rotary hydraulic motors, valve mechanism for connecting said motors in series or in parallel, motor mechanism for operating said series parallel valve mechanism in two positions one for series connection and the other for parallel connection of said motors, pilot valve mechanism for controlling said motor mechanism, said pilot valve mechanism having two positions one corresponding to the series connection of said motors and the other corresponding to the parallel connection thereof, a three position reversing valve mechanism connected to said motors to control the direction of rotation thereof whether connected in series or in parallel, and means associated with said reversing valve mechanism in neutral position for establishing a braking circuit for said motors when driven as pumps by momentum while said series valve mechanism remains in one of its two positions and while said pilot valve mechanism remains in one of its two positions.

5. Apparatus of the class described comprising in combination means including a plurality of rotary hydraulic motors, reversing valve mechanism for controlling the direction of rotation of said motors, valve mechanism for connecting said motors in series or in parallel, motor mechanism for operating said series parallel valve mechanism, pilot valve mechanism for controlling said last-named motor mechanism, and means associated with said pilot valve mechanism for establishing holding circuits for said motor mechanism to hold the series parallel valve mechanism in its adjusted position both when said rotary motors are operated as motors and when operated as pumps by momentum.

FLORENCE H. C. JEFFREY.
Executrix of the Estate of Robert K. Jeffrey, Deceased.

REFERENCES CITED

The following references are of record in the file of this patent:

UNITED STATES PATENTS

| Number | Name | Date |
|---|---|---|
| 949,422 | Gable | Feb. 15, 1910 |
| 1,111,994 | Ciarlo | Sept. 29, 1914 |
| 1,229,076 | Hayes | June 5, 1917 |
| 1,904,011 | Rayburn | Apr. 18, 1933 |
| 1,951,147 | Greist | Mar. 13, 1934 |
| 1,961,592 | Muller | June 5, 1934 |
| 1,977,033 | Adams | Oct. 16, 1934 |
| 1,987,698 | Montelius | Jan. 15, 1935 |
| 1,999,288 | Fjellstedt | Apr. 30, 1935 |
| 2,056,896 | Douglas | Oct. 6, 1936 |
| 2,060,220 | Kennedy | Nov. 10, 1936 |
| 2,086,535 | Centervall | July 13, 1937 |
| 2,087,772 | Kempthorne | July 20, 1937 |
| 2,110,213 | Flowers | Mar. 8, 1938 |
| 2,161,439 | Thoma | June 6, 1939 |
| 2,228,411 | Sheridan | Jan. 14, 1941 |
| 2,358,236 | Lee | Sept. 12, 1944 |
| 2,379,938 | Swanson | July 10, 1945 |
| 2,384,447 | Baldwin | Sept. 11, 1945 |

FOREIGN PATENTS

| Number | Country | Date |
|---|---|---|
| 636,922 | Germany | Oct. 17, 1936 |